Patented Oct. 12, 1954

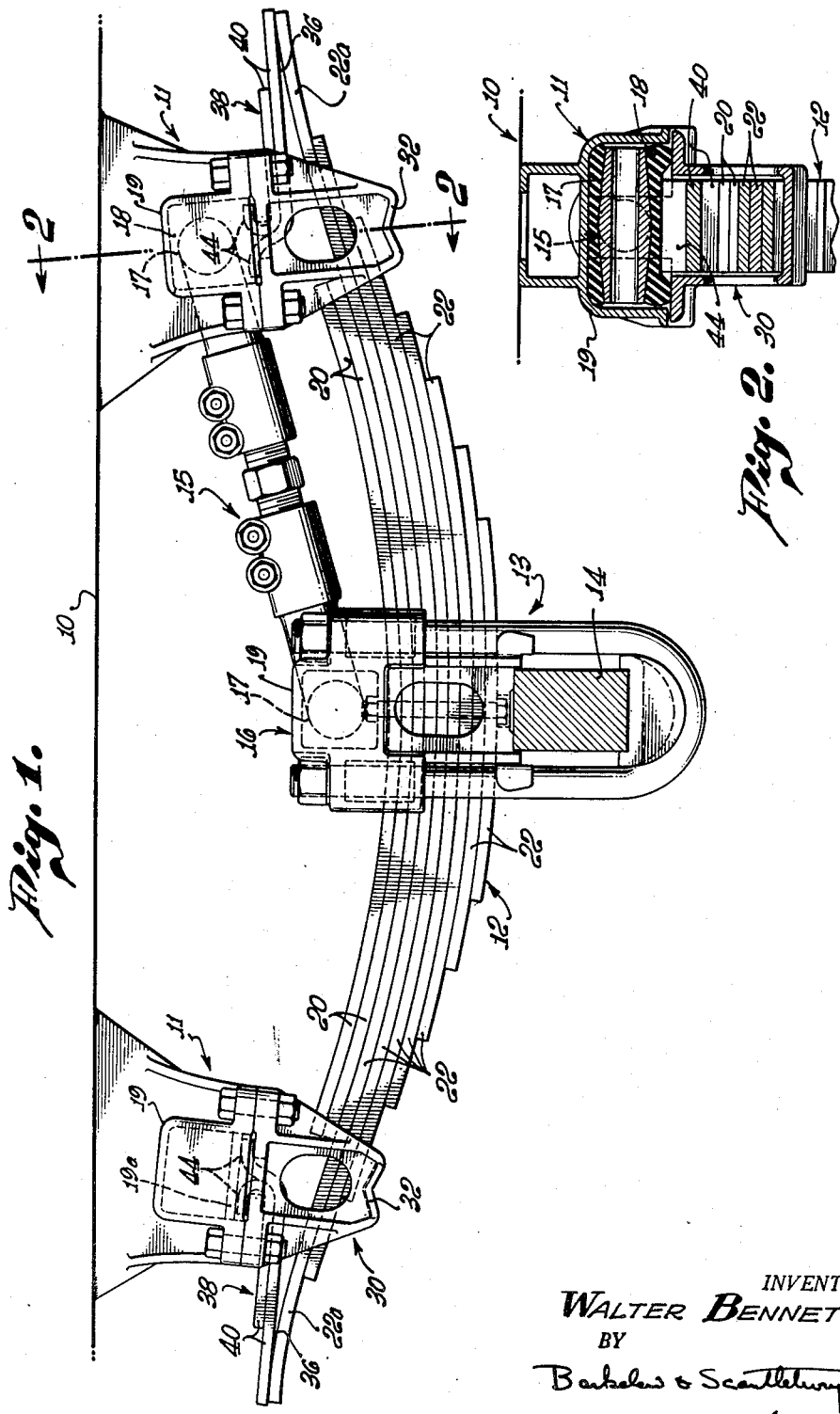

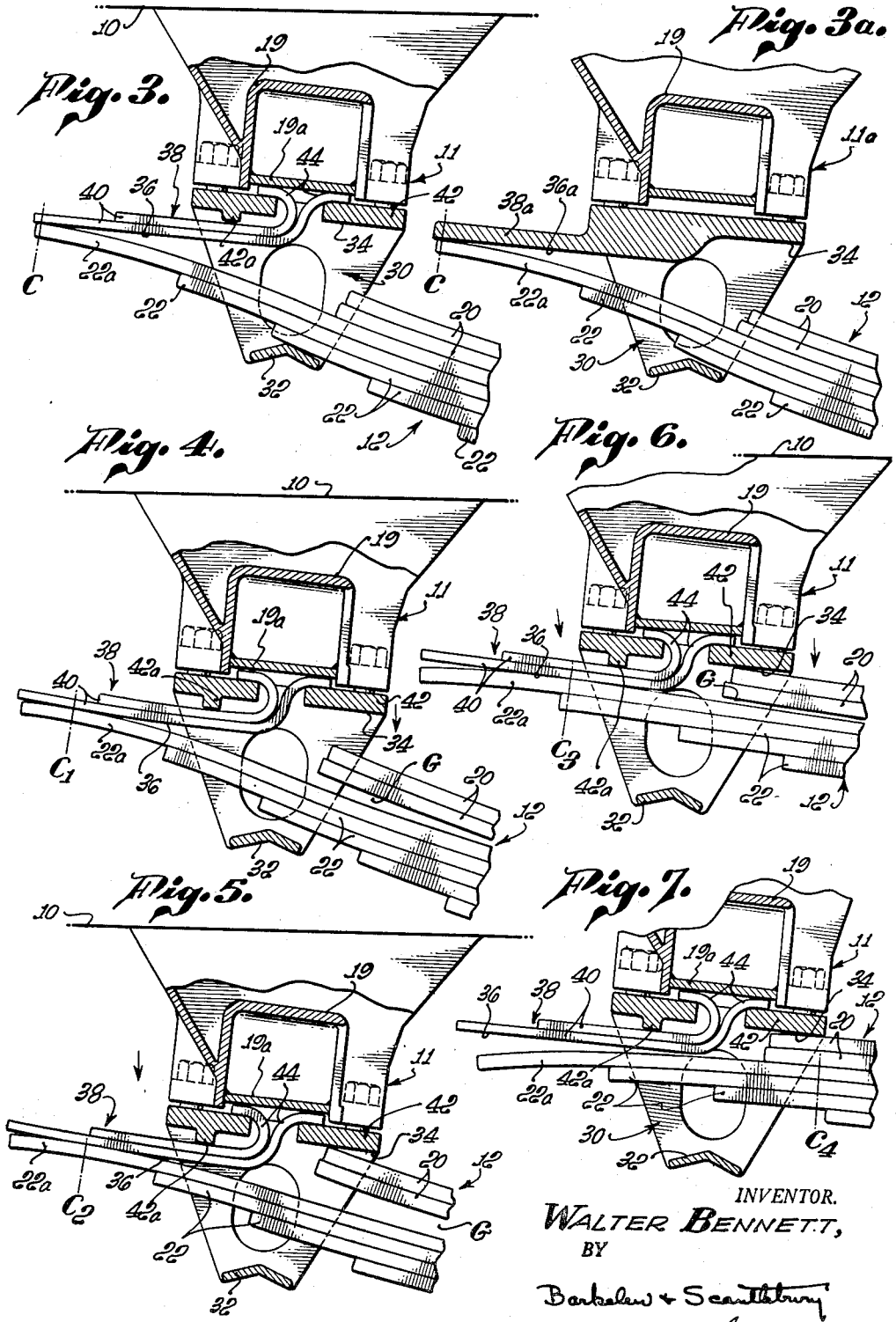

2,691,521

UNITED STATES PATENT OFFICE 2,691,521

PROGRESSIVELY LOADING VEHICLE SUSPENSION SPRING SYSTEM

Walter Bennett, Los Angeles, Calif., assignor to Utility Trailer Manufacturing Company, Los Angeles, Calif., a corporation of California Application June 25, 1951, Serial No. 233,311

3 Claims. (Cl. 267—56)

This invention relates to vehicle spring suspensions of the general kind in which, with increasing load, the spring stiffness is made to increase more rapidly than the increase due to spring distortion alone. The object of the invention is to provide an improved spring suspension system of that general type.

Spring systems in which an additional or supplementary spring comes into play when the main or primary spring is distorted under some predetermined loading, are well known.

The present invention, in one of its aspects, may be said to add to the function of that known type, the further function of shortening the effective length of the primary spring by inter-action between the two springs, thus to further increase the total spring stiffness after the supplemental spring has added its stiffness to the system. That results in two successive additive increases in stiffness as the load increases, instead of only one as formerly. And the system may preferably have an additional additive increase in stiffness by also utilizing a length shortening arrangement for the primary spring. In its present preferred form the system is here shown and described with that additional provision.

Those, and further features of the invention will be best understood from the following description of the preferred and illustrative embodiment which is shown in the accompanying drawings, where:

Fig. 1 is a side elevation showing the illustrative embodiment as it appears under no or substantially no load;

Fig. 2 is a cross-section on line 2—2 of Fig. 1;

Fig. 3 is an enlarged sectional view of the structure shown at the left-hand end of the spring in Fig. 1, the plane of the section being parallel to the plane of the elevation of Fig. 1;

Fig. 3a is a similar section showing a modification; and

Figs. 4, 5, 6 and 7 are similar sectional views showing the spring under progressively increased loadings.

In the drawings, the line at 10 indicates the lower face of a vehicle framing to which the spring hangers 11 are secured in any suitable manner. The suspension spring assembly, here shown as a double ended semi-elliptic leaf spring assembly, is designated as a whole by the numeral 12. Its two ends engage the hangers 11 and its center is held in the bolted clip 13 which also holds the transverse load carrying member 14 which is commonly a wheel axle. Although a spring of the type here shown may be anchored with regard to movement longitudinal of the vehicle frame by having one of its ends anchored at one of the hangers; and although the improved suspension structure which I am about to describe may in its specifically described form be utilized at one end only of the spring; the preferred design shown here is one that utilizes a radius rod acting on the spring and axle at the spring center or base portion, and the spring structure and functioning at its two ends are, as here shown, substantially duplicates. The radius rod 15 is shown connected at one end to the central clip bracket 16 and at the other end to the right hand hanger 11. At both connections the rod has a transverse head 17 held in rubber 18 in a box 19. Aside from the fact that the right-hand hanger 11 receives the radius rod, the structures of the two hangers are substantial duplicates, and the spring design and functioning at its two ends at the hangers, are the same. Fig. 2 thus shows (except for one difference to be noted later) the structure at the left-hand end of the spring as well as that at the right-hand end. And the following description of structure and functioning of one spring end and one hanger applies, in this particular embodiment of the invention, to both ends. But that, as stated before, is not a limitation on the invention.

Referring now more particularly to Figs. 3 and following, it will be noted that the spring assembly 12 has an upper leaf or leaves 20 which are shorter than the next lower leaf or leaves. The upper leaf or leaves 20 (here shown as two) compose what I here term the upper supplemental leaf spring; while the leaves below 20 compose what I term the primary leaf spring. As here shown, the primary leaf spring is made up of a plurality of leaves 22, the uppermost one 22a being preferably the longest and the others progressively shorter as in usual leaf spring design. In relatively unstressed condition as shown in Figs. 1, 2 and 3 (no load or minimum load) the several leaves of both the primary and supplemental springs preferably all lie close together, preferably in mutual contact throughout their lengths.

As shown most clearly in Figs. 2, 3 and 3a, several of the leaves 22 of the lower primary spring project into and through a U-formation 30 which is a part of the hanger 11 and confines those leaves laterally. The bottom or foot 32 of the U-formation lies under those leaves to prevent the hanger from rising clear of them. As shown, the two leaves 20 of the upper supplemental spring also project into the U-formation with their ends located under a downwardly facing spring seat surface 34 on the hanger.

The longest upper leaf 22a of the lower primary spring lies under another downwardly facing spring seat surface 36 or 36a. As shown in Fig. 3a, that seat surface 36a may be formed on a rigid part 38a of the hanger 11a; or, as shown in the other figures, that seat surface 36 may be formed as the lower face of a somewhat resilient hanger extension 38. In the preferred design shown here that resilient extension 38 is formed of two short flat spring leaves 40 hooked at one end through the hanger plate 42 with hook formations 44 and bearing upwardly against a rib 42a on the under side of plate 42. In the left hand hanger which is particularly illustrated in Figs. 3 etc. the hook formations 44 are confined under a plate 19a welded in place across the interior of box 19. In the right hand hanger the hook formations are confined under the rubber in which the radius rod head 17 is held. The resilient extension 38, thus mounted, presents a downwardly facing spring seat 36 which, under load, may flex upwardly (see Figs. 4 and 5) to add to the softness of the lower primary spring action when that spring alone is carrying the load.

In both Fig. 3a and the other figures it will be noted that spring seat surface 36a or 36 is substantially parallel to the spring seat surface 34, and is spaced below surface 34 by a distance approximately equal to the thickness of the upper supplemental spring (in this illustration, the thickness of the two upper spring leaves 20). The outermost end portion of uppermost leaf 22a of the primary spring may be initially formed with a slightly downward bend as shown in Fig. 3; or, if not, it will immediately bend downwardly when subjected to load (Figs. 4 and 5), so as to present an upwardly convexed face to the seat surface 36 or 36a. In the relatively unstressed condition (substantially no or minimum load) the outer end of 22a may lie closely under 36 or 36a or contact that seat surface, and the lower confining foot 32 lies closely under or in contact with the lower primary spring leaf 22 which projects over it.

Figs. 4 to 7 show the spring action under progressively increasing load. Under light or minimum load (e. g. the dead weight of the vehicle) the load is taken by the lower primary spring alone. As shown in Fig. 4, spring leaves 22 are depressed, the effective point of contact of 22a with 36 has moved from the plane indicated by the line C in Fig. 3 to that indicated by line $C_1$ in Fig. 4; and a gap G has developed between uppermost primary leaf 22a and the supplemental leaves 20.

In Fig. 5, under increased load, the effective contact point of 22a with 36 has moved further to $C_2$, shortening the effective length of 22a that much more; and also, in the form shown in these figures, further shortening the effective length of the resilient seat member 38. Gap G has opened wider, and spring seat surface 34 has moved down to contact the end of the upper supplemental spring leaf 20.

As the load further increases the upper supplemental leaves 20 increasingly take part of the load, and, as all the leaves are depressed and straighten out, a position such as that shown in Fig. 6 is reached where the effective contact point of 22a with 36 has moved further in the direction of shortening the effective length of the main spring leaves 22, and the supplemental spring leaves have moved downwardly relative to 22a into almost full contact with 22a. Up to approximately the load condition shown in Fig. 6, the stiffness of the spring system has been increased by the positional change of spring bearing point C and (from Fig. 5 on) by the upper supplemental leaves 22 taking an increased part of the load. In the preferred design as here shown, where leaves 20 are closely clamped to leaves 22 at the center or base, the gap G closes down progressively from the center out, as is indicated in Fig. 6; thus increasing the seating length of 20 and 22 and increasing the stiffness of 20 as the gap G closes down.

Under further load increase from Fig. 6, bearing point C moves further to the right and upper supplemental leaves 20 close down completely on lower primary leaves 22. Between the positions of Figs. 6 and 7, with all the leaves in contact and their outer portions flexed down to the substantially straight, a position is reached where lower 20 lies flatly on 22a, and 22a may still contact seat surface 36 at or near its extreme right end. Between that last mentioned position and that of Fig. 5 where 20 first begins to move down, the end portions of both springs have been moved down together and the end portion of 20 has finally (Fig. 7) seated on 22a at a point intermediate in its length. During that downward movement the intermediate point on 22a which lies under 34 has, due to straightening of the spring, moved down a lesser distance than the ends of the two springs. At the position of Fig. 5, the spacing of the under face of 20 from the upper face of 22a is such that the relative upward movement of the intermediate point on 22a (the difference between its downward movement and that of the end of 22a) causes 20 to seat on 22a. That is because that spacing is not greater than the difference between the depressions of the intermediate point and of the end of 22a.

Further load increase then bends the outer portions of all the spring leaves downwardly (Fig. 7) and 22a leaves contact with 36. In this loading condition, the effective length of the whole spring assembly, including all leaves 20 and 22 acting as a single spring unit, has been shortened to the effective contact plane indicated by $C_4$. By that action of finally shortening the effective length of the primary spring, the final spring stiffness becomes more than the additive stiffnesses of the supplemental spring and the primary spring acting at its normal longer length. That final shortening of the effective length of the primary spring, is due, in the specific design here shown, to the fact that the supplemental spring finally, moving down, seats directly on the primary spring under the supplemental seat 34 (Fig. 7). The under face of lower supplemental leaf 20 thus functions as a contact surface or means associated with the supplemental spring and its seat 34, which moves down, with the supplemental spring when it is moved down by its seat, into contact with a medial portion of the primary spring as the primary straightens out under increased lowering of its outer end. It thus, in function, establishes a downwardly facing load applying seat for the primary spring at an effectively shortened length (specifically, the same length as the supplemental spring) after the auxiliary spring is seated and has begun to take a part of the load.

The functioning of the form shown in Fig. 3a is the same as that described for Figs. 3 to 7, excepting only that the softening action of the resilient seat member 38a at light loads is absent in Fig. 3a.

I claim:

1. A suspension spring system of the character described for supporting a vehicle frame on a load supporting member, comprising the combination of a primary spring unit composed of a primary leaf spring having its base portion mounted on the load supporting member, and means on the frame providing a downwardly facing load applying seat normally engaging the outer end portion of the primary spring at a point establishing a normal effective primary spring length from its base, the primary spring being of such characteristics that intermediate points located at lesser length than its normal effective spring length from its base move down under load through distances less than its end portion at the load applying seat, a supplemental spring unit composed of a supplemental leaf spring having its base portion mounted on the load supporting member, and means on the frame providing a downwardly facing load applying seat engageable with the outer end portion of the supplemental spring at a point establishing an effective supplemental spring length substantially shorter than the normal effective primary spring length, and load transferring means associated with the supplemental spring unit and with the primary spring and acting, by virtue of the lowering of the outer end portions of both springs together under load through a predetermined distance, to establish load transfer to the primary spring at an effective shortened spring length substantially the same as the length of the supplemental spring, said load transferring means comprising a downwardly facing load applying surface associated with the supplemental spring unit, and an upwardly facing load receiving surface associated with the primary spring at a point of shortened spring length substantially the same as the length of the supplemental spring, on which load receiving surface the said load applying surface is adapted to seat, said load applying and load receiving surfaces being spaced apart vertically, when the spring system is under a given load less than maximum, by a distance which is not greater than the difference between the depressions of the end of the primary spring and of a point at its shortened effective length which are caused by load increase above said given load.

2. The combination defined in claim 1 and in which the supplemental leaf spring has its base portion located directly above the base portion of the primary spring and has its outer end portion located above the point of shortened length of the primary spring, and in which the downwardly facing load applying surface of the load transferring means is a surface associated with the outer end portion of the supplemental spring, and the upwardly facing load receiving surface is the upper surface of the primary spring at its point of shortened length.

3. The combination defined in claim 2 and in which the base portion of the supplemental spring is located directly on the base portion of the primary spring and includes a lower leaf of substantially the full length of the supplemental spring adapted to lie for its full length on the upper surface of the primary spring, and in which the said load applying surface associated with the supplemental spring is the under surface of the outer end portion of said lower leaf.

References Cited in the file of this patent

UNITED STATES PATENTS

| Number | Name | Date |
| --- | --- | --- |
| 2,387,874 | Bradley | Oct. 30, 1945 |
| 2,407,236 | Heiney | Sept. 10, 1946 |
| 2,494,683 | Aspin | Jan. 17, 1950 |